United States Patent
Hoelzl

(10) Patent No.: US 11,873,858 B2
(45) Date of Patent: Jan. 16, 2024

(54) ROTOR MAIN BEARING OF A NACELLE FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 17/923,256

(22) PCT Filed: May 7, 2021

(86) PCT No.: PCT/AT2021/060159
§ 371 (c)(1),
(2) Date: Nov. 4, 2022

(87) PCT Pub. No.: WO2021/226645
PCT Pub. Date: Nov. 18, 2021

(65) Prior Publication Data
US 2023/0313833 A1   Oct. 5, 2023

(30) Foreign Application Priority Data

May 12, 2020 (DE) .................. 10 2020 112 765.0

(51) Int. Cl.
*F16C 17/10* (2006.01)
*F03D 80/70* (2016.01)
(Continued)

(52) U.S. Cl.
CPC ............ *F16C 17/105* (2013.01); *F03D 80/70* (2016.05); *F16C 33/08* (2013.01); *F16C 33/208* (2013.01);
(Continued)

(58) Field of Classification Search
CPC ........ F16C 33/208; F16C 33/08; F16C 33/06; F16C 17/105; F16C 2240/54;
(Continued)

(56) References Cited

U.S. PATENT DOCUMENTS 9,458,880 B2 * 10/2016 Kari ..................... F16C 17/10
10,294,926 B2 * 5/2019 Hager ................... F16C 33/122
(Continued)

FOREIGN PATENT DOCUMENTS

AT            509 625 A1    10/2011
DE   10 2017 006 957 A1     1/2019
(Continued)

OTHER PUBLICATIONS

International Search Report in PCT/AT2021/060159, dated Aug. 31, 2021.
(Continued)

*Primary Examiner* — Igor Kershteyn
(74) *Attorney, Agent, or Firm* — Collard & Roe, P.C.

(57) ABSTRACT

A nacelle for a wind turbine includes a nacelle housing; a rotor hub; a rotor bearing for bearing the rotor hub on the nacelle housing, wherein the rotor bearing has at least one inner ring element and at least one outer ring element, wherein at least one sliding bearing element is formed between the inner ring element and the outer ring element. The sliding bearing element is inseparably connected to the inner ring element or the sliding bearing element is inseparably connected to the outer ring element.

14 Claims, 3 Drawing Sheets

Figure 1:
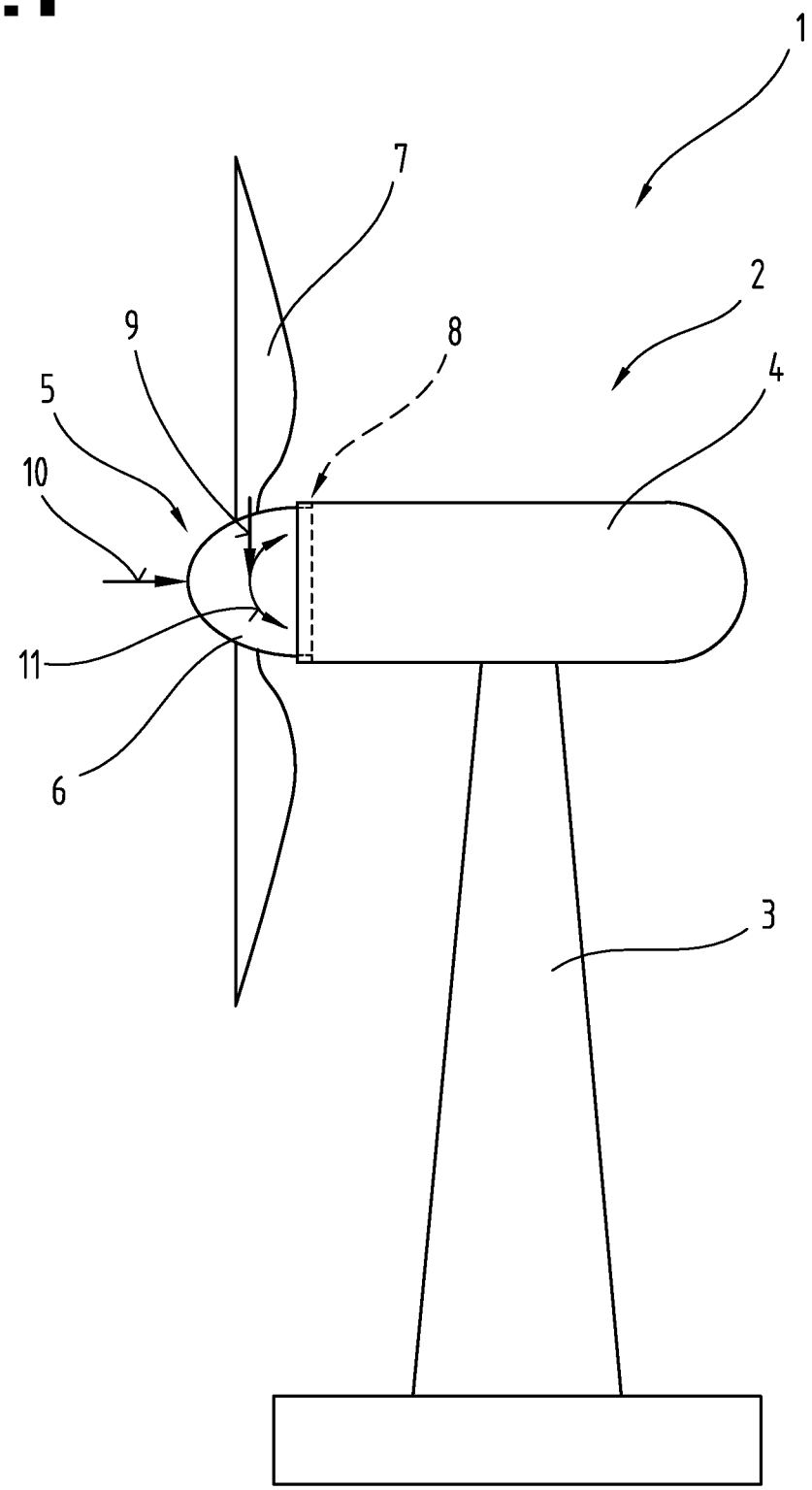

(51) Int. Cl.
*F16C 33/08* (2006.01)
*F16C 33/20* (2006.01)

(52) U.S. Cl.
CPC ....... *F05B 2230/60* (2013.01); *F05B 2240/50* (2013.01); *F16C 2223/46* (2013.01); *F16C 2360/31* (2013.01)

(58) Field of Classification Search
CPC .............. F16C 2220/24; F16C 2223/46; F16C 2360/31; F03D 80/70; F05B 2230/60; F05B 2240/50; Y02E 10/72
See application file for complete search history.

(56) References Cited

U.S. PATENT DOCUMENTS

| 10,598,214 | B2* | 3/2020 | Hoelzl ................... F16C 17/10 |
| 2020/0173425 | A1* | 6/2020 | Schroeder ............... F16C 17/10 |
| 2021/0010462 | A1* | 1/2021 | Hoelzl ................... F16C 33/14 |

FOREIGN PATENT DOCUMENTS

| EP | 2 694 810 B1 | 11/2015 |
| EP | 3 309 393 A1 | 4/2018 |
| WO | 2014/117197 A1 | 8/2014 |
| WO | 2015/110138 A1 | 7/2015 |
| WO | 2018/071941 A1 | 4/2018 |
| WO | 2019/020213 A1 | 1/2019 |
| WO | 2019/178630 A1 | 9/2019 |

OTHER PUBLICATIONS

DIN 8583-5: Sep. 2003, Manufacturing processes forming under compressive conditions—Part 5: Indentation-forming; Classification, subdivision, terms and definitions, Sep. 2003, total of 11 pages (relevance set forth at p. 6 of specification).
DIN 82: 1973-01, Janaury 1973, Knurls, with English translation, total of 8 pages.
DIN 403: Jan. 1973, Knurling wheels, Jan. 1973, total of 4 pages (relevance set forth at p. 6 of specification).
DIN EN 657: Jun. 2005, Thermal spraying—Terminology, classification; German version EN 657:2005, with English translation, Jun. 2005, total of 44 pages.
DIN 8580: Sep. 2003, Manufacturing processes—Terms and definitions, division, Sep. 2003, total of 13 pages (relevance set forth at p. 8 of specification).
DIN 8590: Sep. 2003, Manufacturing processes removal operations—Classification, subdivision, terms and definitions, Sep. 2003 with Feb. 2004 corrections, total of 25 pages (relevance set forth at p. 9 of specification).

* cited by examiner

ROTOR MAIN BEARING OF A NACELLE FOR A WIND TURBINE

CROSS REFERENCE TO RELATED APPLICATIONS

This application is the National Stage of PCT/AT2021/060159 filed on May 7, 2021, which claims priority under 35 U.S.C. § 119 of German Application No. 10 2020 112 765.0 filed on May 12, 2020, the disclosure of which is incorporated by reference. The international application under PCT article 21(2) was not published in English.

The invention relates to a nacelle with a rotor bearing for a wind turbine.

A rotor bearing for a wind turbine is known, for example, from EP 2 694 810 B1.

The rotor bearing known from EP 2 694 810 B1 has a complex structure and is therefore ex-pensive in production and prone to errors.

It was the object of the present invention to overcome the shortcomings of the prior art and to provide a nacelle for a wind turbine which has an improved rotor bearing. Furthermore, it was the object of the present invention to indicate a method for producing the nacelle for the wind turbine.

This object is achieved by means of a device and a method according to the claims.

According to the invention, a nacelle for a wind turbine is formed. The nacelle comprises:
a nacelle housing;
a rotor hub;
a rotor bearing for bearing the rotor hub on the nacelle housing, wherein the rotor bearing has at least one inner ring element and at least one outer ring element, wherein at least one sliding bearing element is formed between the inner ring element and the outer ring element. The sliding bearing element is inseparably connected to the inner ring element. Alternatively, the sliding bearing element is inseparably connected to the outer ring element.

The sliding bearing element comprises a running surface. The running surface of the sliding bearing element cooperates with a surface of the inner ring element if the sliding bearing element is inseparably connected to the outer ring element. The running surface of the sliding bearing element cooperates with a surface of the outer ring element if the sliding bearing element is inseparably connected to the inner ring element.

The nacelle according to the invention, in particular the rotor bearing of the nacelle, entails the advantage that it has a simple structure and is not very prone to errors or has a long service life.

Furthermore, it can be useful if the inner ring element is formed as an integral part of a rotor shaft for receiving the rotor hub or as an integral part of the rotor hub itself. This results in a further simplification of the structure of the nacelle and a surprising increase in failure safety.

Furthermore, it can be provided that the outer ring element is formed as an integral part of the nacelle housing or of a bearing block accommodated in the nacelle housing. This results in a further simplification of the structure of the nacelle and a surprising increase in failure safety.

The nacelle housing is defined as the entirety of the supporting nacelle components. This can also be, for example, a nacelle main frame of the nacelle. In particular, it can be provided that the outer ring element is formed in the nacelle main frame.

When the outer ring element is formed as an integral part of a bearing block received in the nacelle housing, it can be provided that the bearing block is formed so as to be radially divided. The bearing block can, for example, be formed being divided into two bearing block halves. In this regard, it is conceivable that a part of the sliding bearing element is formed in both of the bearing block halves and/or is connected to these.

In other words, the sliding bearing element may be formed being radially or also axially parted together with the inner ring element or outer ring element accommodating the sliding bearing element.

Furthermore, it can be provided that the sliding bearing element is materially bonded to the inner ring element or that the sliding bearing element is materially bonded to the outer ring element. Specifically such a materially bonded connection of the sliding bearing element to the ring element entails a surprising increase in failure safety. Specifically in combination with the measure according to which the inner ring element is formed as an integral part of a rotor shaft for receiving the rotor hub or as an integral part of the rotor hub itself, additional improvements in failure safety can be achieved.

An embodiment, according to which it can be provided that the sliding bearing element is formed as a coating, which is applied directly onto the inner ring element or the outer ring element, is also advantageous. A coating applied directly onto the ring element is particularly easy to manufacture and accurate in shape.

According to an advancement, it is possible that the sliding bearing element is formed for simultaneous radial bearing and axial bearing of the rotor hub. This entails the advantage no separate bearing elements have to be formed for radial bearing and axial bearing of the rotor hub.

Furthermore, it can be provided that the sliding bearing element has other material properties in the region of the radial bearing than it has in the region of the axial bearing. This entails the advantage that the sliding bearing element can have sliding properties adapted to the respective different loads of the radial bearing and the axial bearing. In particular, it can be provided that the sliding bearing element can have a higher strength and/or a higher wear resistance in the region of the radial bearing than in the region of the axial bearing.

Furthermore, it can be useful if the sliding bearing element has a sliding surface in the form of a spherical cap. The shape of a spherical cap can be easily produced and, moreover, entails the advantage that an efficient radial bearing and simultaneous axial bearing of the rotor hub can be achieved.

In addition to this, it can be provided that the inner ring element and/or the outer ring element is formed being parted in the axial direction. This entails the advantage that the rotor bearing can be assembled easily.

Furthermore, it can be provided that the ring element, on which the sliding bearing element is not arranged, is formed being parted in the axial direction. By this measure, it can be achieved that the rotor bearing, despite the possibility of easily assembling it, has a high functionality in use and an increased durability.

According to the invention, a method for producing a nacelle for a wind turbine is provided.

The method comprises the method steps:
providing a nacelle housing;
providing a rotor hub;
providing a rotor bearing for bearing the rotor hub on the nacelle housing, wherein the rotor bearing has at least one inner ring element and at least one outer ring element, wherein at least one sliding bearing element is formed between the inner ring element and the outer ring element. To provide the rotor bearing, the sliding bearing element is inseparably connected to the inner ring element, or the sliding bearing element is inseparably connected to the outer ring element.

The method according to the invention for producing a nacelle, in particular the rotor bearing of the nacelle, entails the surprising advantage that it can be carried out easily, and is thus less prone to errors, to allow for the production of a nacelle with a long lifespan.

According to an advantageous advancement, it can be provided that the sliding bearing element is applied to the inner ring element or the outer ring element by coating. A coating applied directly onto the ring element is particularly easy to manufacture and accurate in shape.

In particular, it can be advantageous if after coating the inner ring element or the outer ring element, the coating is brought into the desired shape by mechanical processing. By this measure, a highly precise rotor bearing can be produced which thus has a long lifespan and excellent sliding properties.

In an alternative embodiment variant, it can be provided that the sliding bearing element is applied to the inner ring element or to the outer ring element by magnetic pulse welding by means of a magnetic force generator. Particularly by means of the method of magnetic pulse welding, sliding bearing elements with outstanding sliding properties can be functionally inte-grated in nacelles of wind turbines.

Furthermore, it can be provided that the strength of the sliding bearing element is smaller than the strength of the inner ring element and the outer ring element. This entails the advantage that the material of the bearing body can be fitted easily to the material of the carrier body and/or be pressed together with it.

Furthermore, it can be provided that a surface structure is formed on the inner ring element or on the outer ring element and that to apply the sliding bearing element to the inner ring element or to the outer ring element, the sliding bearing element and the inner ring element or the outer ring element are pressed against one another, wherein the sliding bearing element is plastically deformed at a connecting surface to the inner ring element or to the outer ring element by action of the surface structure of the inner ring element or of the outer ring element and forms an interlocking connection with the connecting surface. By this measure, it can be achieved that a sufficiently strong connection between the sliding bearing element and the inner ring element or the outer ring element can be achieved, such that the rotor bearing has a high durability and, moreover, is easy to produce.

Moreover, it may be useful if the surface structure of the connecting surface has undercuts, into which the sliding bearing element material is pressed. By this measure, an interlocking connection between the inner ring element or the outer ring element and the sliding bearing can be achieved.

Moreover, it may be provided that the surface structure is produced by means of a laser.

In a further alternative variant, it may be provided that the surface structure is produced by means of a 3D printing method.

Moreover, it may be provided that the surface structure has webs, wherein the webs are deformed when the bearing body and the carrier body are pressed together. This entails the surprising advantage that the connection between the bearing body and the carrier body have an increased strength.

Furthermore, it may be provided that the webs are arranged essentially at a right angle relative to the carrier body connecting surface.

An embodiment, according to which it may be provided that, while the bearing body and the carrier body are being pressed together, the webs bend obliquely relative to their longitudinal extension, is also advantageous. Hereby, a good connection between the carrier body and the bearing body can surprisingly be achieved.

According to an advancement, it is possible that in a web head, the webs have a cross-sectional width of the head, and that at a web base, the webs have a cross-sectional width of the base, wherein the cross-sectional width of the head is greater than the cross-sectional width of the base.

Moreover, it may be useful if the surface structure of the carrier body connecting surface is produced using a deforming method, in particular by using knurling. Particularly, by means of such a rolling method, the required surface structure of the carrier body can be produced easily.

Furthermore, it may be useful if the surface structure of the connecting surface has cross-hatched knurl or a left-right-hand knurl. Surprisingly, the method of cross-hatched knurling or left-right-hand knurling and/or the surfaces produced thereby entail an increased stability between the bearing body and the carrier body compared to all other surface structures or smooth surfaces. Such knurling methods are standardized in DIN 8583-5, DIN 82, DIN 403.

In particular the following terms can be used for the aforementioned knurls according to the standard: RGE: left-right-hand knurl, points raised (fish skin); RGV: left-right-hand knurl, points indented; RKE: cross-hatched knurl, points raised; RKV: cross-hatched knurl, points indented.

In knurling, a difference is made between the non-cutting knurl rolling and the machining knurl-cutting. Depending on the method, the profile is indented by knurling wheels or cut on a knurling milling machine. Using CNC lathes with driven tools, it is also possible to use spe-cial knurling milling tools to avoid rechucking to different machines. As the processing forces in milling are lower, this method is mostly used for thin workpieces or on machining centers.

Particularly the surfaces described above, produced by cross-hatched knurling or left-right-hand knurling, in connection with a carrier body connecting surface and bearing body connecting surface designed to be cylindrical or in the form of a cylinder segment entail a particularly improved stability between the carrier body and the bearing body.

Furthermore, it can be provided that the sliding bearing element is produced directly onto the inner ring element or the outer ring element by cladding.

According to an advantageous formation, it can be provided that the layer of the clad material has a layer thickness of between 0.5 mm and 1.5 mm, in particular between 0.8 mm and 1.2 mm Such a layer thickness entails the advantage that it can have great sliding properties, is easy to produce in terms of process and furthermore, can have a sufficient service life.

The layer thickness is measured from the surface of the workpiece before the cladding process on the sliding surface.

It can be particularly advantageous if the sliding surface has, on the layer of the clad material, an averaged roughness depth Rz of between 0.1 µm and 3.2 µm, in particular between 0.5 µm and 1.6 µm. Surfaces with such an averaged roughness depth Rz entail good sliding properties and are, furthermore, easy to produce on the layer of the clad material.

Furthermore, it can be provided that the clad material consists of or comprises a material selected from a group comprising aluminum base alloys, tin base alloys, bronze base alloys, brass base alloys. Such materials, in particular entail good sliding properties.

Furthermore, it can be provided that the clad material consists of or comprises a material which comprises at least two materials selected from a group comprising aluminum, tin, bronze, brass. Such a combination of multiple materials entails the advantage that various positive properties of the individual materials can be combined in order to also be able to have a long-term resistance in addition to good sliding properties.

An embodiment according to which it can be provided that clad materials for the radial bearing and the axial bearing are formed of different materials, is also advantageous. Because of this, different materials with different material properties can be combined with one another. In particular, thereby, a clad material with the properties adapted to the respective loads can be used for the respective different loads of the radial bearing and the axial bearing.

The methods of thermal spraying are also classed among the surface coating methods. According to the normative definition (DIN EN 657) filler materials, the so-called spray materials, are consumed, fused or melted in these methods within or outside of a spray torch, accel-erated in a gas stream in the form of spray particles and projected onto the surface of the component to be coated. In this method, as opposed to cladding, the component surface is not fused and only subjected to low amounts of thermal stress. Therefore, the methods of cladding and thermal spraying can be clearly distinguished from one another.

An inseparable connection within the meaning of the present document is any connection which cannot be released without at least partially destroying the sliding bearing element and/or the connected ring element in its structure. A connection by a releasable fastening means, such as a screw, is not considered an inseparable connection within the meaning of the present document. A connection by a fastening means which can be released only by destruction, such as a rivet, is not considered an inseparable connection within the meaning of the present document, either. Such an inseparable connection can, for example, be a materially bonded connection.

A sliding bearing element in the form of a coating within the meaning of the present document is a layer, which is applied to a carrier by coating, a main group of the production methods according to DIN 8580. The coating can be a thin layer or a thicker layer as well as multiple interconnected layers. The coating processes, by type of layer application, are differenti-ated into chemical, mechanical, thermal and thermomechanical processes.

Moreover, it can be provided that laser cladding, in particular laser powder cladding, is used as the welding method.

It is further possible that a polymer-based running-in layer is arranged on the sliding bearing element so as to achieve a better adaptability of the sliding bearing running surface to the counter running surface during running in of the sliding layer, wherein it is of additional advantage that this running-in layer also improves the tribology of the sliding bearing per se. An advantage of this is that the polymer-based running-in layer can be applied by means of a spraying method.

As an alternative thereto, it may be provided that the entire sliding bearing element is made of a polymer-based material. In this regard, it is advantageous that the sliding bearing element can be applied directly onto the inner ring element or the outer ring element by means of a spraying method.

Cladding according to DIN 8590-"Coating by means of welding" refers to a welding opera-tion in which a volume buildup takes place exclusively by means of the filler metal, such as wire or powder, often in the form of a top layer. Here, the component surface to be cladded is melted. The method is therefore classed among the surface coating methods.

For the purpose of better understanding of the invention, it will be elucidated in more detail by means of the figures below.

Figure 2:
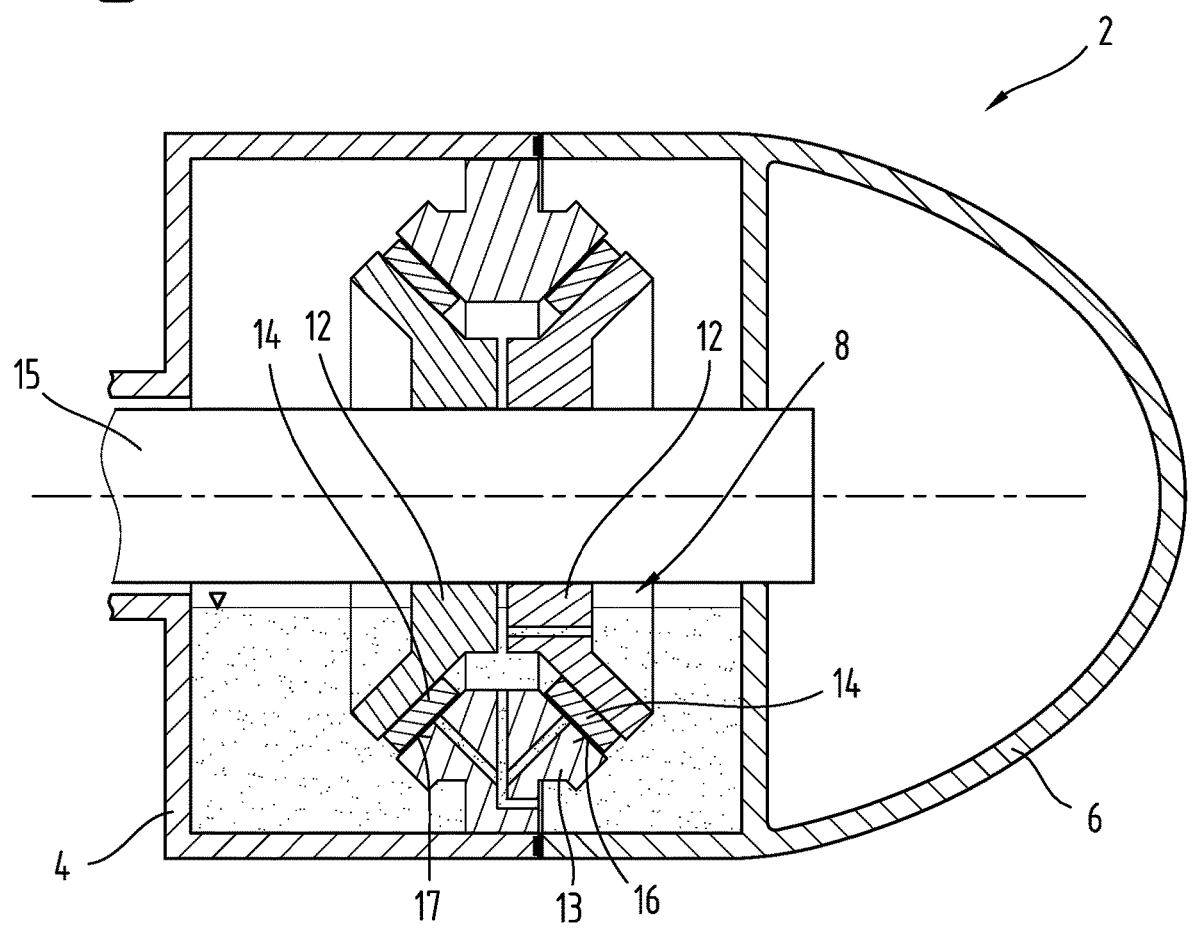
Figure 3:
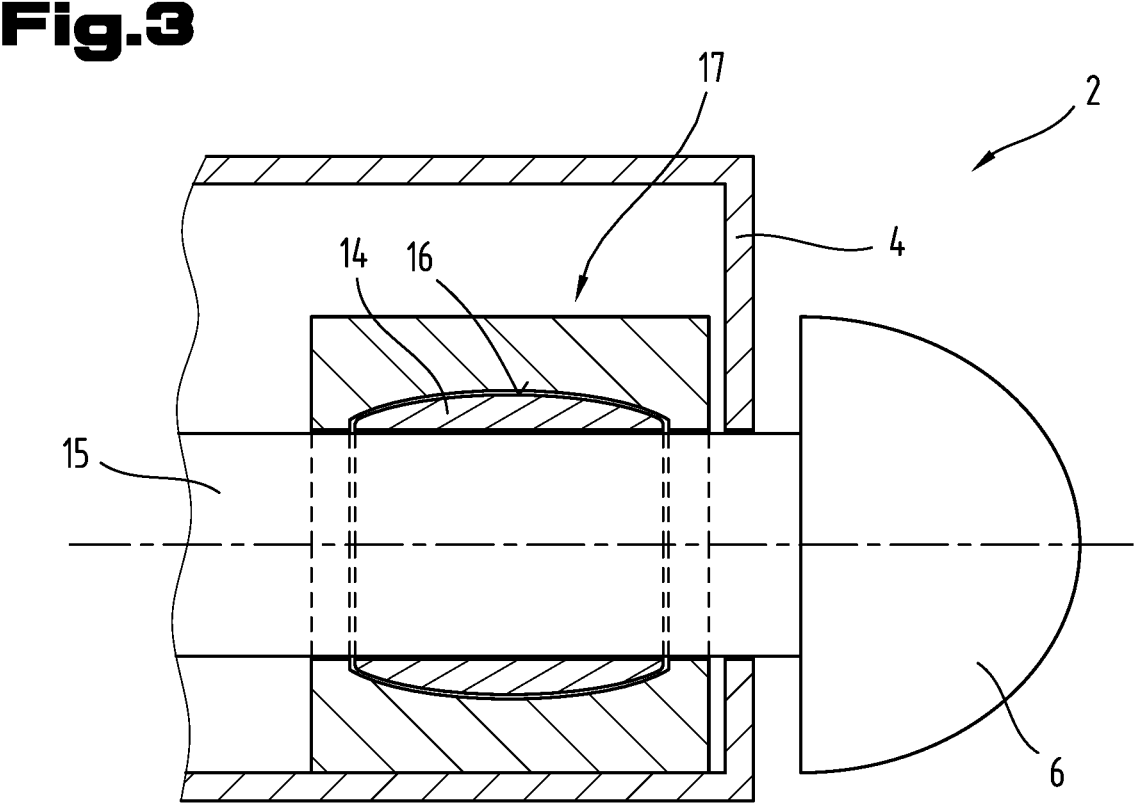

These show in a respectively very simplified schematic representation:

FIG. 1 a schematic representation of a wind turbine;

FIG. 2 a cross-section of a first exemplary embodiment of a nacelle in a highly schematic representation;

FIG. 3 a cross-section of a second exemplary embodiment of a nacelle in a highly schematic representation.

First of all, it is to be noted that in the different embodiments described, equal parts are provided with equal reference numbers and/or equal component designations, where the disclo-sures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be ro-tatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14 is arranged between the inner ring element 12 and the outer ring element 13.

As can be seen from FIG. 2, it may be provided that the inner ring element 12 is coupled with the rotor hub 6. In particular, it may be provided that a rotor shaft 15 is formed, on which the rotor hub 6 is arranged. The inner ring element 12 can be received directly on the rotor shaft 15.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14 are each formed so as to be spaced apart from each other on the V-shaped flank between the two ring elements 12, 13, which sliding bearing elements 14 are arranged at an angle to one another. As can further be seen from FIG. 2, it can be provided that the sliding bearing elements 14 are arranged directly on the inner ring element 12. Hence, a sliding surface 16 may be formed between the sliding bearing elements 14 and the outer ring element 13. In an arrangement of the sliding bearing elements 14 as it is shown in FIG. 2, the sliding surfaces 16 may also be arranged in a V-shape.

As can also be seen from FIG. 2, it may be provided that the inner ring element 12 is designed to be parted with regard to its axial extension or, alternatively, along a central axis, in order to make the assembly of the rotor bearing 8 easier.

In an exemplary embodiment that is not depicted, it is of course also conceivable that the inner ring element 12 does not form a groove as shown in the exemplary embodiment of FIG. 2, but rather that the V-shaped arrangement has a reverse formation, so that a V-shaped projec-tion is formed on the inner ring element 12. In this case, it may be provided for the purpose of an easier assembly that the outer ring element 13 is designed to be parted in its axial extension or, alternatively, along a central axis.

Both in a design with an inner ring element 12 partible in the axial extension and in a design with an outer ring element 13 partible in the axial extension, it may be provided that the individual parts of the respective partibly designed ring element 12, 13 are formed so as to be axially adjustable relative to one another, in order to be able to compensate for example the wear of the sliding bearing elements 14. In particular, it may be provided that due to the axial ad-justability of the individual parts of the ring elements 12, 13 relative to one another, the bearing gap can be adjusted.

In FIG. 3, a further and possibly independent embodiment of the nacelle 2 is shown, wherein again equal reference numbers and/or component designations are used for equal parts as in the preceding FIGS. 1 and 2. In order to avoid unnecessary repetitions, it is pointed to/reference is made to the detailed description in FIGS. 1 and 2 preceding it.

As can be seen from FIG. 3, it can be provided that the sliding bearing element 14 is formed as a coating which is applied directly onto the inner ring element 12, wherein the inner ring element 12 is embodied as an integral part of the rotor shaft 15 for receiving the rotor hub 6.

In this exemplary embodiment, the sliding bearing element 14 has a sliding surface 16 in the form of a spherical cap. Here, the sliding bearing element 14 is embodied for simultaneous radial bearing and axial bearing of the rotor hub 6.

As can further be seen from FIG. 3, it can be provided that the outer ring element 13 is embodied as an integral part of a bearing block 17 received in the nacelle housing 4. As can further be seen from FIG. 3, it can be provided that the bearing block 17 is embodied being parted into an upper part and a lower part along a central axis.

In a further embodiment variant, which is not shown, it can be provided that the sliding bearing element 14 has a conical or V-shaped design for simultaneous radial bearing and axial bearing of the rotor hub 6.

In a further embodiment variant, which is not shown, it can be provided that the sliding bearing element 14 has a cylindrical radial sliding bearing running surface and has an axial sliding bearing running surface on the front side for simultaneous radial bearing and axial bearing of the rotor hub 6. This axial sliding bearing running surface can, for example, be designed in the form of a stepping.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and draw-ings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Wind turbine
2 Nacelle
3 Tower
4 Nacelle housing
5 Rotor
6 Rotor hub
7 Rotor blade
8 Rotor bearing
9 Radial force
10 Axial force
11 Tilting torque
12 Inner ring element
13 Outer ring element
14 Sliding bearing element
15 Rotor shaft
16 Sliding surface
17 Bearing block

The invention claimed is:

1. A nacelle (2) for a wind turbine (1), the nacelle (2) comprising:
   a nacelle housing (4);
   a rotor hub (6);
   a rotor bearing (8) for bearing the rotor hub (6) on the nacelle housing (4), wherein the rotor bearing (8) has at least one inner ring element (12) and at least one outer ring element (13), wherein at least one sliding bearing element (14) is formed between the inner ring element (12) and the outer ring element (13),
   wherein the sliding bearing element (14) is inseparably connected to the inner ring element (12) or wherein the sliding bearing element (14) is inseparably connected to the outer ring element (13).

2. The nacelle (2) according to claim 1,
   wherein the inner ring element (12) is formed as an integral part of a rotor shaft (15) for receiving the rotor hub (6) or as an integral part of the rotor hub (6) itself.

3. The nacelle (2) according to claim 1, wherein the outer ring element (13) is formed as an integral part of the nacelle housing (4) or of a bearing block (17) accommodated in the nacelle housing (4).

4. The nacelle (2) according to claim 1, wherein the sliding bearing element (14) is materially bonded to the inner ring element (12) or that wherein the sliding bearing element (14) is materially bonded to the outer ring element (13).

5. The nacelle (2) according to claim 1, wherein the sliding bearing element (14) is formed as a coating, which is applied directly onto the inner ring element (12) or the outer ring element (13).

6. The nacelle (2) according to claim 1, wherein the sliding bearing element (14) is embodied for simultaneous radial bearing and axial bearing of the rotor hub (6).

7. The nacelle (2) according to claim 6,
   wherein the sliding bearing element (14) has other material properties in the region of the radial bearing than it has in the region of the axial bearing.

8. The nacelle (2) according to claim 1, wherein the sliding bearing element (14) has a sliding surface (16) in the form of a spherical cap.

9. The nacelle (2) according to claim 1, wherein the inner ring element (12) and/or the outer ring element (13) is formed being parted in the axial direction.

10. The nacelle (2) according to claim 9,
    characterized in that wherein the ring element (12, 13), on which the sliding bearing element (14) is not arranged, is formed being parted in the axial direction.

11. A method for producing a nacelle (2) for a wind turbine (1), the method comprising the method steps:
    providing a nacelle housing (4);
    providing a rotor hub (6);
    providing a rotor bearing (8) for bearing the rotor hub (6) on the nacelle housing (4),
    wherein the rotor bearing (8) has at least one inner ring element (12) and at least one outer ring element (13), wherein at least one sliding bearing element (14) is formed between the inner ring element (12) and the outer ring element (13),
    wherein, for providing the rotor bearing (8), the sliding bearing element (14) is inseparably connected to the inner ring element (12) or that wherein the sliding bearing element (14) is inseparably connected to the outer ring element (13).

12. The method according to claim 11,
    wherein the sliding bearing element (14) is applied to the inner ring element (12) or the outer ring element (13) by coating.

13. The method according to claim 12,
    wherein, after coating the inner ring element (12) or the outer ring element (13), the coating is brought into the desired shape by mechanical processing.

14. The method according to claim 11,
    wherein the sliding bearing element (14) is applied to the inner ring element (12) or to the outer ring element (13) by magnetic pulse welding by means of a magnetic force generator.

\* \* \* \* \*